Sept. 26, 1967  J. WADDINGTON  3,343,755
BUILDER ARM PILOT CONTROL
Filed Oct. 7, 1964  5 Sheets-Sheet 1 ited States Patent Office 3,343,755
Patented Sept. 26, 1967

3,343,755
BUILDER ARM PILOT CONTROL
James Waddington, Clemson, S.C., assignor to Maremont Corporation, Chicago, Ill., a corporation of Illinois
Filed Oct. 7, 1964, Ser. No. 402,288
3 Claims. (Cl. 242—26.3)

The present invention relates to improvements in builder mechanism, and more particularly to an improved builder mechanism of the general type employed in twisting frames having means for varying the effective length of the builder arm, thereby controlling the bobbin profile.

It is a principal object of the invention to provide a novel and improved mechanism for varying the length of the builder arm during machine operation for the building of a desired bobbin profile.

It is a further object of the invention to provide a novel and improved construction of the builder arm length control mechanism including a pilot wind control mechanism for adjusting the operation of this device which is readily accessible to the operator from the outside of the machine.

With these and other objects in view as may hereinafter appear the several features of the invention consist in the devices, combinations and arrangement of parts hereinafter described and claimed which together with the advantages to be obtained thereby will be readily understood by one skilled in the art from the following description taken in connection with the accompanying drawings in which:

Figure 1:
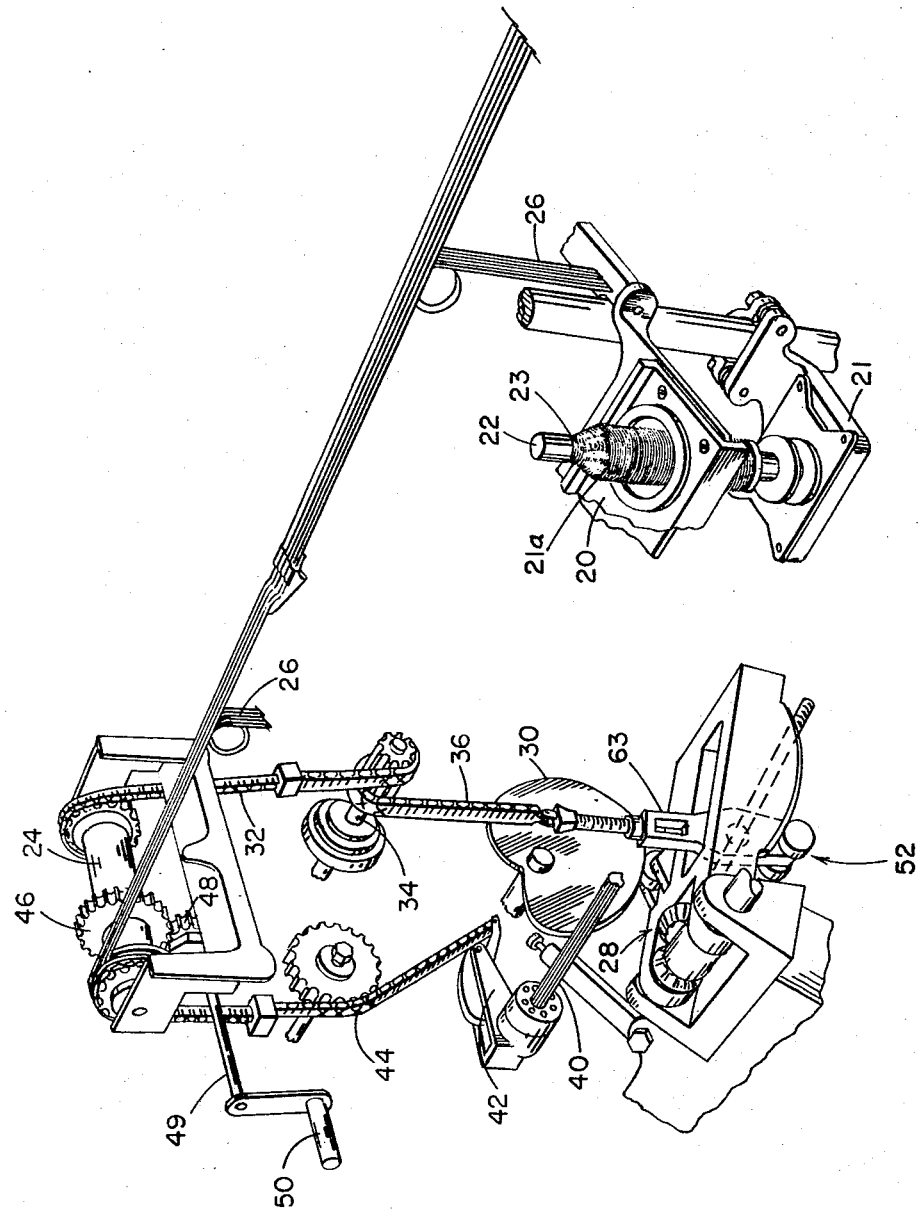
FIG. 1 is a diagrammatic view of the wind mechanism for a twister frame including the spindle rail with a spindle and wound bobbin thereon, the traversing ring rail, the builder cam, the builder arm, and intervening connections.

Referring to the drawings, particularly FIG. 1, a wind mechanism suitable for use in a twister frame is shown somewhat diagrammatically including a ring rail 20 and a spindle rail 21 having mounted thereon spindles carrying wound bobbins 22, a windlass shaft 24 connected with the ring rail 20 by suspender straps 26, and connected with a builder arm 28 and builder cam 30 by means of a chain 32, drum 34 and chain 36. The windlass shaft 24 is biased in one direction to urge the ring rail 20 upwardly and to support the builder arm 28 against the builder cam 30 by means of a torsion bar 40 and arm 42 which is connected by chain 44 with the windlass shaft 24. In the illustration shown it is contemplated that the windlass shaft 24 and associated traversing elements may be wound down to a doff and starting position through manually operated connections which include a gear 46 on the windlass shaft 24 and a meshing pinion 48 carried on a manually rotatable shaft 49 by handle 50. The general arrangement of the machine so far described may be similar to that shown, for example, in United States Patent No. 3,072,350, to Anderson et al., dated January 8, 1963, for Builder Mechanism.

Figure 4:
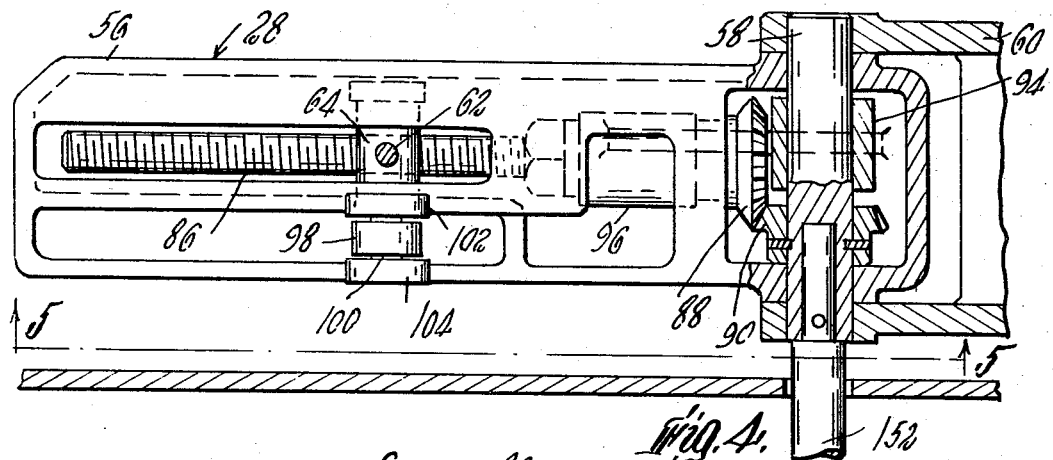
FIG. 4 is a sectional plan view taken on a line 4—4 of FIG. 2 illustrating particularly the builder arm, the adjustable connector with the wind suspension linkage and a portion of the driving connections for adjusting said connector.
Figure 5:
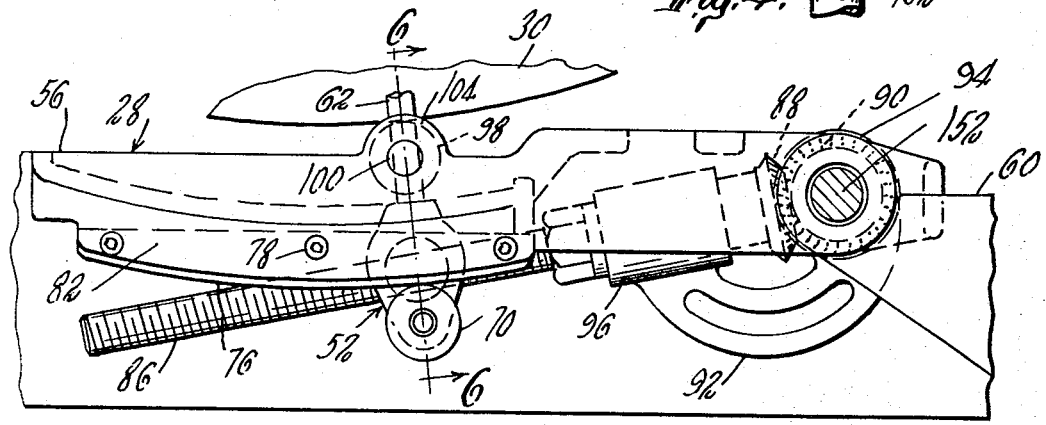
FIG. 5 is a view in side elevation taken on a section line 5—5 of FIG. 4 illustrating substantially the parts shown in FIG. 4, but including additionally the builder cam and cam follower.

The builder mechanism herein disclosed is of the general type having a connector between the builder arm and the flexible member 36 for imparting a building motion to the traversing elements, and including means for adjusting the connector longitudinally of the builder arm to vary the length of the arm and thereby the length of the traverse imparted to the ring rail 20 and associated traversing elements. In accordance with the usual practice the connector generally designated at 52 is adjustable lengthwise of the builder arm along an arculate guideway so constructed and arranged that the connector 52 is always brought to the same downward position regardless of the position of adjustment along the length of the builder arm. The length of the upward traverse of the connector, and of the traversing elements therewith is varied correspondingly as the effective length of the builder arm is increased or decreased. The builder arm construction of the present invention, as best shown in FIGS, 4, 5 and 6, comprises a frame member 56 rotatably supported on a drive shaft 58, see FIG. 4, which is in turn supported in bearings provided in a frame 60 forming part of the machine base.

Figure 6:
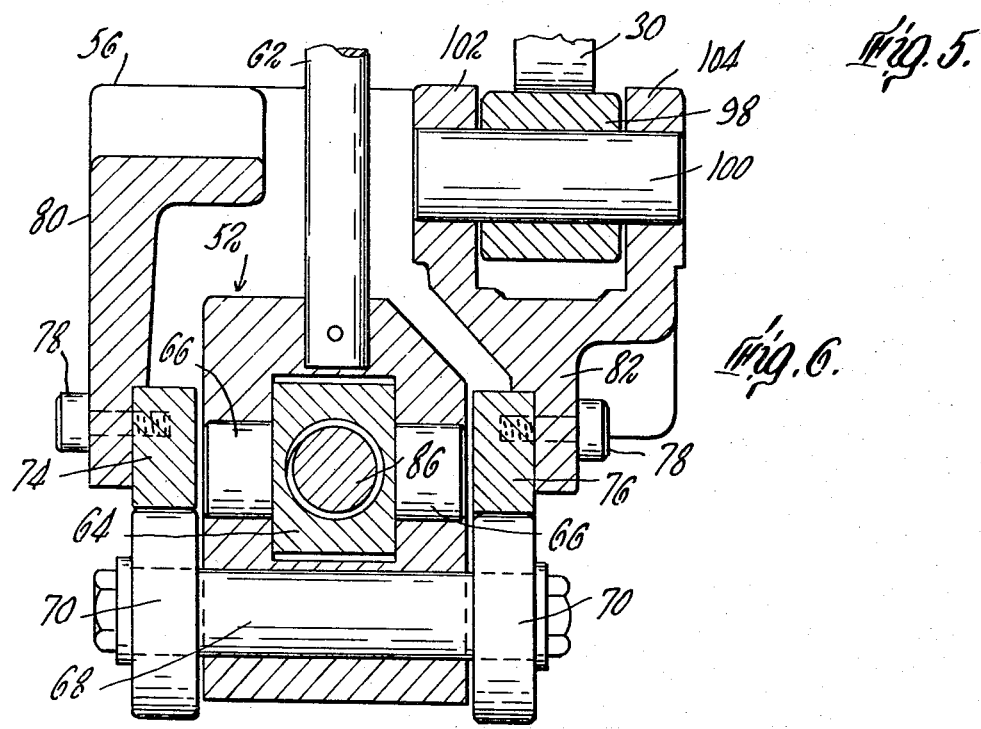
FIG. 6 is a sectional view taken on a line 6—6 of FIG. 5, but illustrating particularly the connector supporting guideways for the same on the builder arm and the builder arm and the builder cam and follower connections.

The connector 52 comprises a block having the upper face thereof journaled to receive a rod 62 forming the bottom element of a turn buckle 63 which is in turn connected to the lower chain 36. The central portion of the block is hollowed to receive a nut 64 having trunnions 66 extending from each side thereof and supported in transverse journals formed in the block. The lower portion of the block is formed with a cylindrical bearing aperture to receive a transverse shaft 68 supporting rollers 70 at each end thereof. As best shown in FIG. 6, the block is supported between two guide members 74, 76 which are secured by bolts 78 with two downwardly extending ribs 80, 82 of the builder arm 28. The bottom edges of the guides 74, 76 are adapted to be engaged by the rolls 70 and are rockered about the axis of the drum 34 as a radius for the down position of the builder arm 28 so that for any position of adjustment of the connector 52 along the length of arm 28, traversing elements including the ring rail 20 will be brought always to the same down position.

In the illustrated construction, the connector 52 is adjusted longtudinally of the builder arm 28 to adjust the effective length of the builder arm through connections comprising a screw 86 threaded through the nut 64 and at one end formed with a bevel gear 88 which meshes with a bevel gear 90 secured to the drive shaft 58. The screw 86 is arranged to swing about the axis of the shaft 58 in a bracket 92 having a sleeve bearing element 94 rotatably supported on the shaft 58 and a sleeve element 96 providing a bearing in which the screw 86 is rotatably supported and held against axial movement to maintain the bevel gear 88 in engagement with the bevel gear 90.

In the illustrated construction there is supported on the builder arm 28 a follower roll 98 supported on a transverse pivot pin 100 mounted in journals formed in two upstanding ribs 102, 104 on the builder arm 28. The follower roll 98 is arranged to be held in engagement with the builder cam 30 by the biasing action of the torsion bar 40 acting through the connections above described for imparting reciprocatory movement to the traversing elements of the frame.

Figure 2:
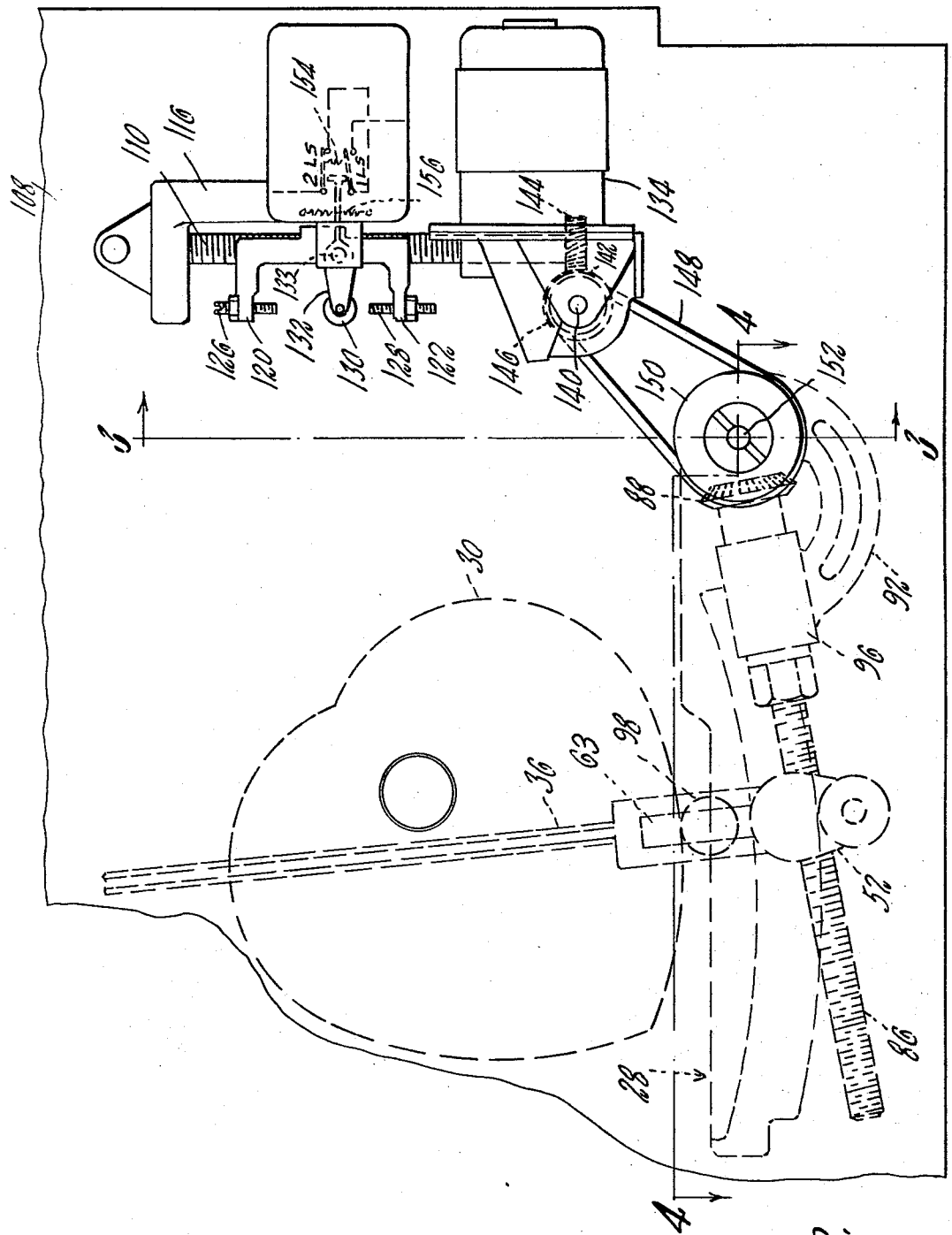
FIG. 2 is a fragmentary view looking from the end of the machine illustrating the pilot wind control mechanism for effecting adjustments of the connector on the builder arm and thereby for adjusting the effective length of the builder arm, the latter part together with the builder cam being indicated in dotted lines behind said end plate.
Figure 3:
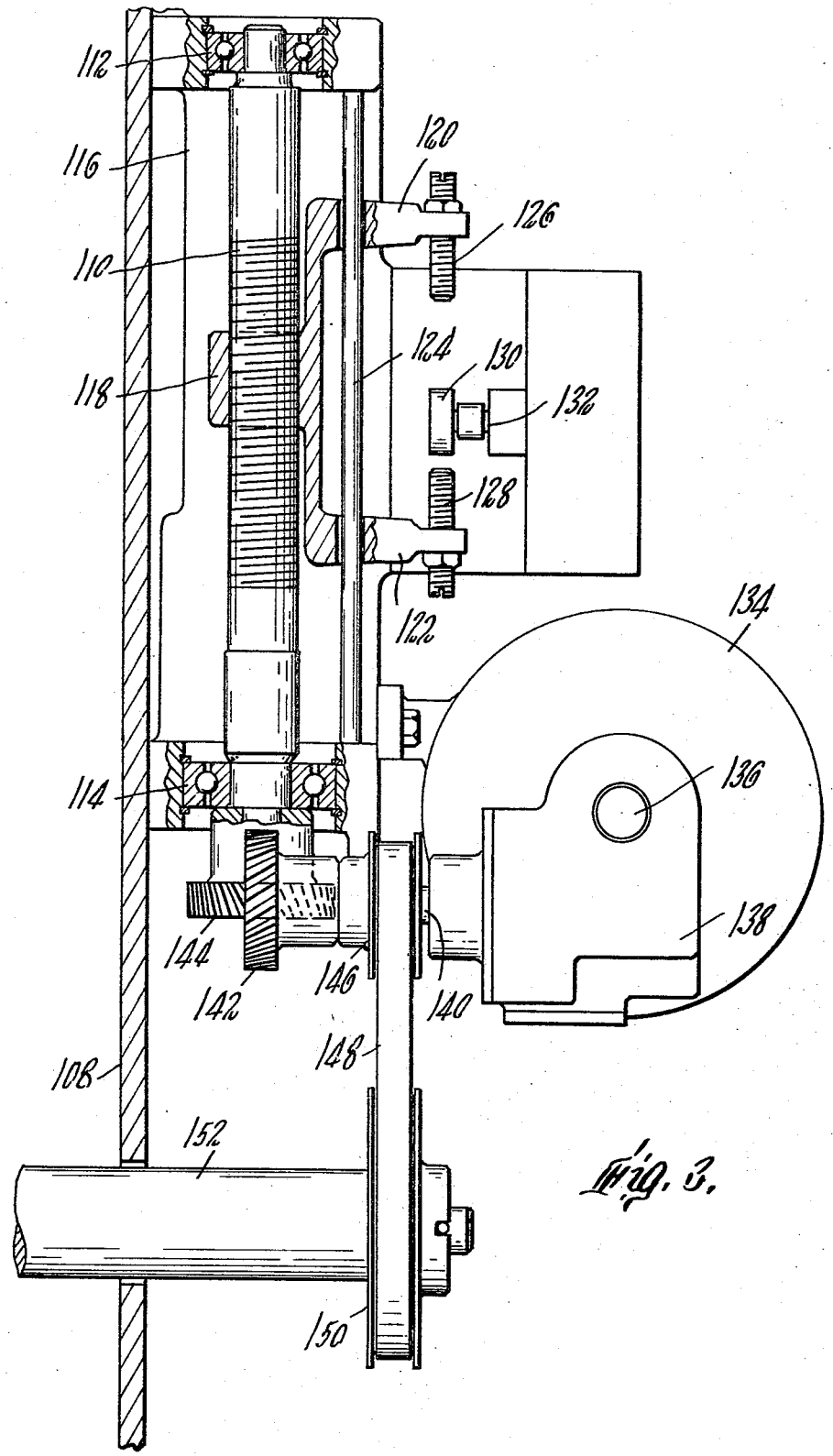
FIG. 3 is a vertical section taken on a line 3—3 of FIG. 2 illustrating particularly the pilot wind control mechanism.

The principal elements of the wind mechanism above outlined including the builder cam 30 and builder arm 28 are normally mounted within the machine in positions which are relatively inaccessible to the operator. As here shown these elements are mounted behind one of the end frames or plates thereof designated at 108 in FIGS. 1, 3 and 4. In accordance with the invention a pilot wind control mechanism for effecting adjustments of the connector 52 longitudinally of the builder arm 28 is provided which is mounted on an exterior portion of the machine in a position readily accessible to the operator, permitting such adjustments of the bobbin wind to be made conveniently and, if so desired, without interruption of machine operation. The pilot wind control mechanism as best shown in FIGS. 2 and 3 comprises a screw 110 rotatably supported to turn on a vertical axis in bearings 112, 114 on a bracket 116 secured to the outside of the end plate 108 of the machine. A nut 118 having two spaced-apart arms 120, 122 is threaded to the screw 110. A shaft 124 supported at its two ends on abutments of the bracket 116 and in parallel relation to the screw 110, is arranged to pass through apertures in the arms 120, 122 of nut 118 and thus to support the nut against angular movement while permitting longitudinal adjustment of the same as the screw is turned. The arm 120 of nut 118 carries an adjustable stop screw 126, and the arm 122 similarly carries a stop screw 128, said screws being adapted to be moved alternatively into engagement with a roller 130 carried on the end of a reversing switch arm 132 as the nut 118 is moved longitudinally in one direction or the other by the continued rotation of the screw 110. The screw 110 is driven, and the screw 86 for controlling the position of connector 52 on the builder arm 28 is driven synchronously with the screw 110, through connections which include a reversible servo motor 134 supported on the bracket 116. The armature shaft 136 of the motor is connected to a reduction gear box 138 having an output shaft 140 which carries at its outer end a spiral gear 142 arranged to mesh with a spiral gear 144 formed on the lower end of screw 110. A pulley 146, also mounted on the output shaft 140, is connected by a belt 148 with a pulley 150 mounted on an extension 152 of the drive shaft 58 about which the builder arm 28 is fulcrumed.

In the construction shown the pilot nut 118 (see FIG. 3) is arranged to be moved upwardly as the connector 52 is moved outwardly on the builder arm 28. The position of the shoulder 21a of the wound bobbin 22, as defined by the minimum amount of builder traverse, is determined by the adjustment of the inner short wind limit stop 126, and is reached when the pilot nut 118 reaches the bottom limit of its movement. The position of the upper end of the bobbin wind at 23 on the bobbin tip is determined by the adjustment of the outer long wind limit stop 126 and is reached when the pilot nut 118 and connector 52 reach the limit of their respective upward and outward movement. It will be appreciated that these adjustments of the readily accessible electrical controls can be made by the operator at any time without interference with or interruption of machine operation.

Figure 7:
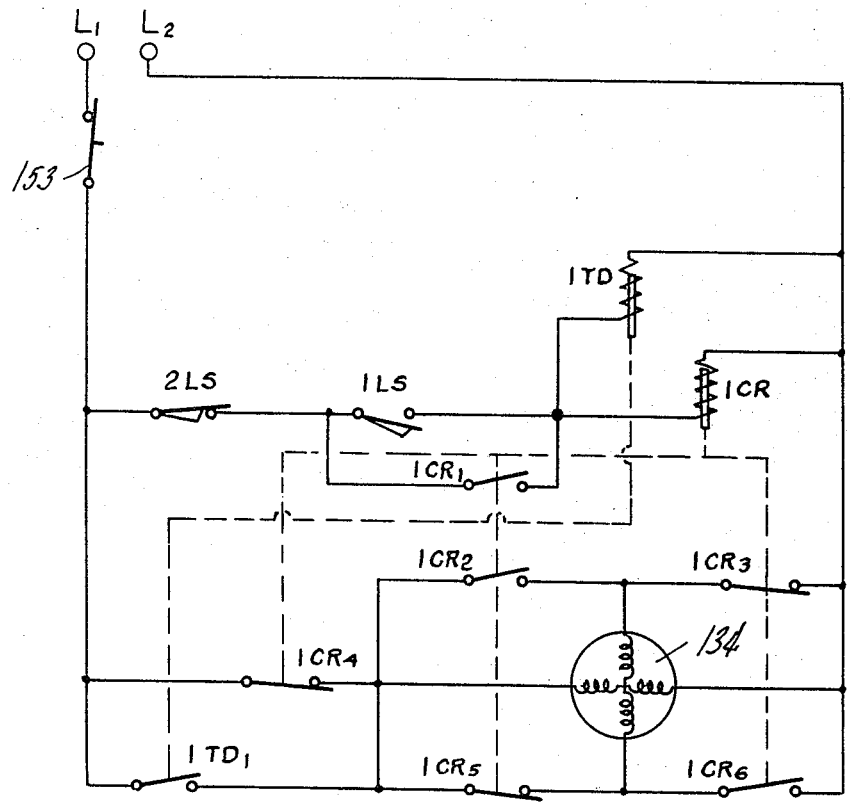
FIG. 7 is a diagrammatic view of the electrical control system by means of which the frame is adapted for producing the desired wind.

The electrical connections by means of which the reversible electric motor 134 is controlled are somewhat diagrammatically shown in the electrical diagram FIG. 7 of the drawings. Power is supplied by two lines $L_1$, $L_2$ at 115 volts to the reversible motor 134, to a time delay relay 1TD, and to a relay coil 1CR. An isolating switch 153 in the line $L_1$ provides a convenient means for rendering the motor 134 inoperative as, for instance, when it is desired to wind a straight wind bobbin. Reversal of the direction of drive of the motor 134 at each of the two limit positions is effected for the long wind position by the closing or normally open limit switch 1LS and for the short wind position by opening the normally closed limit switch 2LS.

The operation of the control system for the winding of a partial taper top is briefly described in connection with FIG. 7 as follows:

Movement of the pilot nut 118 to the top end of its stroke causes the long wind stop screw 128 to rock switch arm 132 about its pivot 133 in a direction to close switch 1LS, normally held open by a spring 154. The closing of the switch 1LS closes a circuit through the normally closed switch 2LS energizing time relay 1TD and the control relay 1CR. Contact $1CR_1$ closes, establishing a holding circuit for the relays 1TD and 1CR. Normally closed switch contact $1CR_4$ opens causing the motor 134 to stop.

The several contacts controlled by solenoid 1CR are now conditioned to drive the motor in a direction to move the builder arm connector 52 and the pilot nut 118 from the long wind toward the short wind position when the time delay relay 1TD finally operates to close switch contact $1TD_1$. As best shown in the diagram FIG. 7, when relay 1CR is energized, contacts $1CR_2$ and $1CR_6$ close and contacts $1CR_3$ and $1CR_5$ open. At the end of the delay period determined by the setting of the time delay solenoid 1TD, contact $1TD_1$ closes starting the motor 134 moving the connector 52 and pilot nut 118 toward the short wind position. Switch 1LS is now permitted to move to its disengaged position under the influence of a return spring 154 as switch arm 132 is returned to an intermediate neutral position by centering springs 156.

When the pilot nut 118 reaches the short wind limit position, the short wind stop screw 126 rocks switch arm 132 about its pivot 133 in a direction to open switch 2LS, normally held closed by the spring 158 above noted. Both relays 1TD and 1CR are deenergized. The normally open contact $1TD_1$ is permitted to open and the several contacts controlled by the relay 1CR are conditioned to reverse the current flow in the reversible motor 134, thus contact $1CR_1$ opens thus disengaging the holding circuit for limit switch 1LS. Contact $1CR_1$ opens thus disengaging the holding circuit for limit switch 1LS. Contacts $1CR_2$ and $1CR_6$ open, while contacts $1CR_4$, $1CR_5$ and $1CR_3$ close thus immediately starting the motor 134 in the reverse direction, moving the pilot nut 118 and connector 52 toward the long wind position.

The length of wind (ranging from the shortest to the longest ring rail stroke) is completely independent from the beginning of the doff, and from the ending of the doff. That is, an empty bobbin may be donned, and the twister started, regardless of the ring rail position or the length of wind at the moment. The same is true for doffing.

On initial setting only, the long stroke could be made on the empty bobbin to establish the upper limit (tip) of the package. Thereafter, the action of the connector 52 and the cam 30 are random, and the incidence of having them simultaneously reverse would be extremely rare.

Two different builds are possible:

(1) A full taper-top build (identified by a constant slope from the shoulder to the bare bobbin) is achieved with the delay timer inactive. Three to twelve minutes are required for cycling from long to short to long stroke (wind) with this build.

(2) A partial taper-top build (identified by a constant slope from the shoulder to a flat bobbin head of somewhat smaller diameter than the flat base) is achieved by activating the delay timer (1 to 30 min.) as the connector reaches its outermost travel. The long stroke is thereby maintained until the timer cuts out. A whole cycle with the partial taper top package build would take from 4 to 40 minutes. Since package builds require from 4 hours to 8 hours or more, the number of cycles per package varies greatly.

The invention having been described what is claimed is:

1. A wind control mechanism for twister and spinning frames having traversing elements and operating means including a builder mechanism for imparting reciprocatory movements to said traversing elements for winding strand on a package having, in combination, a rotary builder cam, a builder arm pivotally supported at one end thereof and engageable with said builder cam for oscillation thereby and a connector on said builder arm through which the oscillatory movements of said builder arm are transferred to the traversing elements supported for movement along the path longitudinally of said builder arm, a pilot wind control mechanism comprising a pilot member adapted to be shifted along a predetermined path at a location on a frame apart from said builder arm, a drive mechanism connected to impart simultaneous corresponding movements to said pilot member and said connector along their respective paths, and a control mechanism actuated by movement of said pilot member along said predetermined path for operating said drive mechanism to control the movement of said connector and, therefore, the wind of said package.

2. A wind control mechanism for twister and spinning frames according to claim 1, in which there is provided a screw and nut connection for moving each of said connector and said pilot member along their respective paths, a reversible driver, and branch connections from said driver to each of said screw and nut connections.

3. A wind control mechanism for twister and spinning frames according to claim 1, in which said drive mechanism includes a reversible electric motor connected to impart simultaneous corresponding movements to said pilot member and said connector along their respective paths to extend and alternatively to shorten the effective length of said builder arm between long wind and short wind positions, and the control mechanism comprises a pair of adjustable short and long wind limit stops, a limit switch and electrical connections including a time delay relay actuated by said long wind limit stop to activate said time delay relay and thereafter to initiate operation of said motor to move said connector and pilot member toward the short wind limit position, and a second limit switch and electrical connections actuated by said short wind limit stop to initiate operation of said motor to move said connector and pilot member toward the long wind limit position.

References Cited

UNITED STATES PATENTS

| 1,984,641 | 12/1934 | Hargreaves | 242—26.3 |
| 2,295,724 | 9/1942 | Edfors | 242—26.3 |
| 2,345,245 | 3/1944 | Edfors | 242—26.3 |
| 2,656,989 | 10/1953 | Haythornthwaite | 242—26.4 |
| 2,922,591 | 1/1960 | Hope | 242—26.3 |

FOREIGN PATENTS

| 1,243,025 | 8/1960 | France. |

STANLEY N. GILREATH, *Primary Examiner.*